United States Patent
Dowling et al.

(10) Patent No.: US 11,780,174 B2
(45) Date of Patent: Oct. 10, 2023

(54) SURFACE PREPARATION

(71) Applicant: University College Dublin, National University of Ireland, Belfield (IE)

(72) Inventors: Denis Dowling, Dublin (IE); James N. Barry, Dublin (IE)

(73) Assignee: University College Dublin, National University of Ireland, Belfield (IE)

( * ) Notice: Subject to any disclaimer, the term of this patent is extended or adjusted under 35 U.S.C. 154(b) by 63 days.

(21) Appl. No.: 16/762,427

(22) PCT Filed: Nov. 2, 2018

(86) PCT No.: PCT/EP2018/080058
§ 371 (c)(1),
(2) Date: May 7, 2020

(87) PCT Pub. No.: WO2019/091873
PCT Pub. Date: May 16, 2019

(65) Prior Publication Data
US 2021/0370615 A1    Dec. 2, 2021

(30) Foreign Application Priority Data
Nov. 7, 2017 (GB) ..................... 1718387

(51) Int. Cl.
*B32B 38/10* (2006.01)
*B29C 65/00* (2006.01)
(Continued)

(52) U.S. Cl.
CPC ............ *B29C 66/028* (2013.01); *B29C 59/14* (2013.01); *B29C 65/4835* (2013.01);
(Continued)

(58) Field of Classification Search
CPC .................................................. B29C 66/028
See application file for complete search history.

(56) References Cited

U.S. PATENT DOCUMENTS

| 4,487,880 A | 12/1984 | Ueno et al. |
| 4,678,711 A * | 7/1987 | Atkins ................... C08J 7/0427 |
| | | 428/414 |

(Continued)

FOREIGN PATENT DOCUMENTS

| CN | 1978530 A | 6/2007 |
| CN | 101321614 A | 12/2008 |

(Continued)

OTHER PUBLICATIONS

Ward, Pamela P. "Plasma process control with optical emission spectroscopy." In Seventeenth IEEE/CPMT International Electronics Manufacturing Technology Symposium.'Manufacturing Technologies—Present and Future', pp. 166-169. IEEE, 1995.*

(Continued)

*Primary Examiner* — Jeffry H Aftergut
(74) *Attorney, Agent, or Firm* — Brian J. Colandreo; Jeffery T. Placker; Holland & Knight LLP

(57) ABSTRACT

A surface preparation method (200) for a composite material (104) having an original surface (110), the material (104) comprising fibres (104a) within a matrix (104b), comprises removing (204) a surface portion of the matrix (104b) by plasma ablation so as to reveal and activate (206) a new surface (120) with at least a portion of a plurality of the fibres (104a) exposed thereon, without creating a residual heat-affected zone.

10 Claims, 5 Drawing Sheets

(51) Int. Cl.
  *B29C 59/14* (2006.01)
  *B29C 65/48* (2006.01)
  *B29C 73/26* (2006.01)
  *B29K 63/00* (2006.01)
  *B29K 305/00* (2006.01)
  *B29K 307/04* (2006.01)
  *B29K 309/08* (2006.01)
  *B29K 309/00* (2006.01)

(52) U.S. Cl.
  CPC ...... *B29C 66/1122* (2013.01); *B29C 66/3034* (2013.01); *B29C 66/41* (2013.01); *B29C 66/71* (2013.01); *B29C 66/7212* (2013.01); *B29C 66/7394* (2013.01); *B29C 2059/145* (2013.01); *B29C 2073/262* (2013.01); *B29K 2063/00* (2013.01); *B29K 2305/00* (2013.01); *B29K 2307/04* (2013.01); *B29K 2309/08* (2013.01); *B29K 2309/14* (2013.01)

(56) References Cited

U.S. PATENT DOCUMENTS

| | | | |
|---|---|---|---|
| 5,900,104 | A | 5/1999 | Lukins, Jr. |
| 8,623,651 | B2 | 1/2014 | Sun et al. |
| 8,632,651 | B1 | 1/2014 | Hicks |
| 9,387,511 | B1 | 7/2016 | Jackson |
| 2002/0124962 | A1 | 9/2002 | Selwyn et al. |
| 2005/0061779 | A1* | 3/2005 | Blumenfeld ........ B23K 26/03 219/121.6 |
| 2005/0227724 | A1 | 10/2005 | Tsai |
| 2017/0002851 | A1 | 2/2017 | Shin |
| 2017/0028510 | A1 | 2/2017 | Shin |

FOREIGN PATENT DOCUMENTS

| | | |
|---|---|---|
| CN | 101580594 A | 11/2009 |
| CN | 103229602 A | 7/2013 |
| DE | 4407478 A1 | 9/1994 |
| DE | 201201220286 A1 | 5/2014 |
| EP | 0191680 A1 | 8/1986 |
| EP | 1952971 A1 * | 8/2008 |
| JP | 51-100172 | 9/1976 |
| JP | 2000169977 A | 6/2000 |
| JP | 2004183063 A | 7/2004 |
| JP | 2009-510207 A | 3/2009 |
| JP | 2012129510 A | 7/2012 |
| JP | 2016175331 A | 10/2016 |
| KR | 20120041252 A | 4/2012 |
| KR | 1020120055042 A1 | 5/2012 |
| RU | 20080117169 A | 11/2009 |
| WO | 2019091873 A1 | 5/2019 |

OTHER PUBLICATIONS

Kim, Jin Kook, Hak Sung Kim, and Dai Gil Lee. "Adhesion characteristics of carbon/epoxy composites treated with low-and atmospheric pressure plasmas." Journal of adhesion science and technology 17, No. 13 (2003): 1751-1771.*

Dowling, Denis P., et al. "Influence of de pulsed atmospheric pressure plasma jet processing conditions on polymer activation." Plasma Processes and Polymers 8.8 (2011): 718-727.*

Kim, Jin Kook, Hak Sung Kim, and Dai Gil Lee. "Adhesion characteristics of carbon/epoxy composites treated with low- and atmospheric pressure plasmas." Journal of adhesion science and technology 17.13 (2003): 1751-1771.*

Kruse, T., Körwien, T., Heckner, S., & Geistbeck, M. (2015). Bonding of CFRP primary aerospace structures—crackstopping in composite bonded jointsunder fatigue. In Proceedings of the 20th International Conference on Composite Materials (ICCM/20), Copenhagen (pp. 19-24).*

International Search Report and Written Opinion mailed in International Application No. PCT/EP2018/080058 dated Feb. 27, 2019.

Coburn, J. W. et al., "Plasma Etching—A Discussion of Mechanisms", Journal of Vacuum Science and Technology, IBM Research Laboratory, vol. 16, No. 2, Mar./Apr. 1979, pp. 391-403.

Coburn, J. W. et al., "Ion- and electron-assisted gas-surface chemistry—An Important effect on plasma etching", Journal of Applied Physics, vol. 50, No. 5, (May 1979), 8 pages.

Tachi, S. et al., "Low-Temperature Reactive Ion Etching and Microwave Plasma Etching of Silicon", Journal of Applied Physics Letters, vol. 52, No. 8, (Feb. 22, 1988), pp. 616-618.

Tendero, C. et al., "Atmospheric Pressure Plasmas: A Review", Spectrochimica Acta Part. B, vol. 61, pp. 2-30 (2006).

International Search Report and Written Opinion issued in PCT Application Serial No. PCT/EP2018/080058 dated Feb. 27, 2019; 16 pages.

Great Britain Intellectual Property Office, Patents Act 1977: Search Report Under Section 17 of GB International Application No. 1718387.2 dated May 8, 2018.

Law, V. et al., "Air Based Atmospheric Pressure Plasma Jet Removal of FreKote 710-NC prior to composite-to-composite adhesive bonding", International Journal of Adhesion and Adhesives, vol. 54, 2014, pp. 72-81.

"Plasma Etching Behaviour of Carbon Fibre Reinforced Plastics and Optical Fibres," Fachbereich Werkstoffwissenschaften und—Technick und Ecole Europeene d'Ingenieurs en Genie des Materiaux (Doppeldiplom) SS 2008.

JY Jeong et al., "Etching Materials with an Atmospheric-Pressure Plasma Jet," 1998 Plasma Sources Sci., Technol. 7 282.

* cited by examiner

SURFACE PREPARATION

CROSS-REFERENCE TO RELATED APPLICATIONS

This application is a U.S. National Stage of International Patent Application No. PCT/EP2018/080058, filed 2 Nov. 2018, which claims priority to Great Britain Patent Application No: 1718387.2, filed on 7 Nov. 2017, the disclosure of which is incorporated herein by reference in its entirety.

The invention relates to a surface preparation method for a composite material comprising fibres within a matrix. In particular, the invention relates to the use of plasma treatment for surface tailoring, without creating a residual heat-affected zone (otherwise known as reflow). In particular, but not exclusively, the invention relates to an improved method of joining together one or more pieces of a light-weight composite material such as a carbon fibre composite.

There is a need for controlled repair and/or bond joint enhancement of composite materials, and in particular of light-weight composite materials (LWCs) such as carbon fibre materials and the likes. LWCs are composite materials that are lighter than metal and generally chosen to replace metal parts in load-bearing structures. The skilled person will appreciate that the invention described herein also has utility for heavier composites, such as polyester-glass fibre composites, but that the economic benefits may not be as marked for heavier composites.

In the prior art, plasma treatment is known for use in cleaning and activating surfaces prior to joining surfaces together. Plasma treatments are used to remove surface contaminants and to embed ions in the surface layer so as to increase bonding. As is known in the art, "*Surface activation consists in grafting chemical functions (plasma active species) on the material surface in order to give it specific properties by varying its surface energy. The plasma composition influences the treated material superficial properties*" (see C. Tendero, C. Tixier, P. Tristant, J. Desmaison, P. Leprince, "*Atmospheric pressure plasmas: A review*", Spectrochimica Acta Part B: Atomic Spectroscopy 61(1) (2006) 2-30). Activation of a surface is therefore superficial modification of the properties of that surface by the grafting of plasma active species.

Joining of composites enables a reduction in cost, both capital and processing, allowing larger scale products to be produced using smaller scale components. To date, the available bonding processes for LWC materials have lagged considerably behind the research and development of LWC materials and their fabrication processes, with the limited joining research focusing primarily on adhesive re-development. This has led to continued use of either; metal fastener plates and bolts, replication of traditional metal jointing, or, over bulking the joint with adhesive for increased confidence, due to the erroneous supposition that 'more is better'. At present, these are the industry preferred options, but are not the ideal solutions, and do not align with the technical developments in the composites industry.

Composites (including LWCs), in their non-monocoque form, are being applied more readily than previously in structural applications. In these high load scenarios, the joint systems are paramount, as they are often the limiting factor (weakest link). This restricts the industrial applications, particularly in markets such as; automotive, premium consumer goods, mass transport, energy generation and aerospace, where guaranteed operating requirements need to be met for structural components.

In addition, prior art repair techniques and processes for LWC materials have also trailed behind the research and development of new LWC materials. This has led to the present repair options: scrapping and replacing damaged composite components; or the addition of heavy metal plates and bolts to reinforce any damaged zones. These options are not industry preferred solutions due to the high cost of the former and the increase in weight (and potential imbalance) and reduced fatigue life associated with the latter.

The use of bonded repair with composites facilitates a reduction in the cost of repair, relative to "scrape and replace" of components, while maintaining the composite's light-weight nature by the bonding of composite to composite using a material similar to the composite's polymer matrix. However, experimental studies using traditional bonding techniques have shown that repairs performed using adhesive bonding can restore components to between only 30-80% of their original strength. This limits the industrial applications of bonding, particularly in the case of premium consumer goods, transport, energy generation and aerospace, where guaranteed operating requirements need to be satisfied.

Consequently, a need to develop bond enhancement techniques, repair techniques and processes for the uniform treatment of LWC materials is readily apparent. This is reflected in industry reports, with a large number of industries utilising LWCs now calling for the development of cost effective bonding techniques which can outperform their mechanically-fastened counterparts in joint and repair applications.

In addition to repair, the manufacturing of bonded LWC components, where two or more separate components are combined using a bonding agent, is also in need of improvement.

Considering this, there are three significant limitations to be considered with the bonding, joining or repairing of LWCs (or other composites);

The fabrication of a bonded joint that is both robust and lightweight (bonding two (or more) LWC components together, whether this be as part of a repair job or manufacture of a new product);

Low cost bonded repair of in-service lightweight parts; and

On-site repair of medium/large composite objects such as composite boats or wind turbines.

According to a first aspect of the invention, there is provided a surface preparation method for a composite material having an original surface, the material comprising fibres within a matrix. The method comprises removing a surface portion of the matrix by plasma ablation so as to reveal and activate a new surface with at least a portion of a plurality of the fibres exposed thereon, without creating a residual heat-affected zone.

The ablation may be or comprise sublimation of the surface portion of the matrix—i.e. the matrix material may be directly taken off as a gas without first melting or charring.

The method may comprise removing the surface portion of the matrix by plasma ablation so as to reveal and activate the new surface with at least a portion of a plurality of the fibres exposed thereon, without damaging the exposed fibres.

No fibres may be exposed prior to the ablation. More fibres may be exposed after the ablation than before the ablation. Alternatively or additionally, more of one or more already-partially exposed fibres may be exposed after ablation.

The skilled person will appreciate that, whilst plasma activation of matrix material of extant composite surfaces is known, the use of a plasma to remove matrix material and expose a new surface is a marked departure from current approaches. Prior art systems generally remove "weak organic material" such as surface oils or grease, but do not ablate the matrix. Further, the exposure of fibres by removal of the matrix material advantageously allows for stronger bonding to an adhesive or other applied layer or material, as the exposed fibres extend into the applied layer or material.

In the 2014 paper V. Law et al., "*Air based atmospheric pressure plasma jet removal of FreKote 710-NC prior to composite-to-composite adhesive bonding*" (Int. J. of Adhesion and Adhesives, Vol. 54, 2104), the authors report accidental removal of composite matrix material whilst testing plasma treatment methods for removal of a surface contaminant. However, a residual Heat Affected Zone (HAZ) is formed; as stated in the paper, "*the thermally affected zone expands outwards with the plasma ablating the tip resin layer; after charring it comes away from the surface exposing the underlying carbon weave*" (bridging sentence from columns 1 to 2 on page 75 of the cited paper). HAZs are known to have a negative effect on material properties, so avoiding HAZ formation would be desirable. However, a technical leap exists between matrix removal and matrix removal without HAZ.

Further, whilst the removal of material disclosed in the paper of V. Law et al. is described therein as ablation, the removal is a result of charring the surface in slow steps, burning off the matrix material. The removal is therefore a result of thermal damage to the material. By contrast, the present invention causes the matrix material to be removed by sublimation, or vaporisation, without thermal damage and charring.

It was not suggested in the paper of V. Law et al. that plasma treatment could be controlled to avoid HAZ formation whilst still providing matrix removal, much less how this could be done. The inventors appreciated that ablating matrix material from the composite surface without raising the temperature of the remaining composite above its glass transition temperature, $T_g$, would avoid negative thermal effects on composite material properties. Suitable plasma treatment parameters are disclosed and discussed herein.

The method optionally further comprises controlling the plasma ablation so as to do at least one of, and optionally all of, the following:
  (i) keep a temperature of the non-ablated material below a threshold temperature above which reflow occurs;
  (ii) keep the treatment speed slow enough for the surface preparation to be completed and fast enough to avoid thermal damage;
  (iii) manage ion gas flow and Plasma Cycle Time so as to allow a plasma power of 22-25 kHz to be used without thermal damage to the material;
  (iv) keep nozzle height close enough to the material to allow material to be ablated (without thermal damage to the material), optionally below 9 mm; and
  (v) keep ionised gas flow low so as to increase the number of plasma reactive species per volume of plasma, optionally below 3000 l/h at 1 bar.

The plasma ablation is optionally performed using an ionisation gas flow of 1800-2200 litres/hour at around 1 Bar.

The skilled person will appreciate that ionisation gas flow may be a more significant contributor to the ablation process than various other parameters, affecting fibre damage/preservation, polymer ablation, and surface activation. Generally, a lower gas flow rate may be better, allowing the gas to be sufficiently energised in its transition through the energisation chamber due to slower movement, whilst still providing enough gas to create a sustainable plasma.

The plasma ablation is optionally performed using a Plasma Cycle Time (PCT) of between 50% and 85%.

The skilled person will appreciate that PCT controls the on/off cycle of the plasma—generally speaking, the more the plasma is "on" during operation (i.e. the higher the PCT), the more reactive species the surface will encounter. In various embodiments, use of as low a PCT as reasonably possible whilst maintaining a stable plasma was found to avoid or reduce fibre damage, and improve matrix removal.

The plasma ablation is optionally performed using a plasma power of 22-25 kHz.

The skilled person will appreciate that the frequency of the plasma power may provide the energy to selectively excite reactive species within an ionisation gas (e.g. electrons, reactive species, ions etc.). Control of frequency may facilitate control of the thermal nature of the plasma. Frequency adjustment may determine the reactive species present in the plasma and thus relative energy and temperature. As compared to prior art atmospheric pressure plasma treatment regimen, the frequency used in various embodiments may be relatively high, with a lower PCT to offset thermal effects.

The plasma ablation is optionally performed using a plasma nozzle located between 2 mm and 10 mm from the material, and preferably between 6 mm and 8 mm from the material, for example at 7.5 mm from the surface.

In contrast to the industrial convention, the inventors appreciated that reducing nozzle height (i.e. moving the nozzle closer to the area to be treated/ablated) could offer advantages for plasma surface treatment whilst avoiding HAZ formation. The ranges identified herein are considerably below that generally accepted in industry for activation whilst avoiding HAZ.

The plasma ablation is optionally performed using a treatment speed of 50-100 mm/s (or optionally higher for e.g. robotic systems with higher speed limits), and optionally of 50-60 mm/s.

The inventors appreciated that increasing treatment speed, and so reducing plasma exposure time of each portion of the material to be treated, could offset potential damage to the material resulting from the closer nozzle (reduced nozzle height from surface). Given treatment speeds above, the exposure time for an arbitrary spot in a composite surface to be treated may typically be 0.05 to 0.1 seconds; considerably lower than that of prior art systems.

The plasma ablation is optionally performed using a voltage of 212-309 V, and optionally of 275-309 V.

The skilled person will appreciate that this voltage is the strike voltage for the plasma. The voltage enables a stable plasma to be formed and acts to sustain that plasma during interaction with a material to be treated. If too high a voltage were used, fibre damage could be caused.

In various embodiments, the inventors identified the plasma treatment process as being particularly sensitive to four plasma parameters:
  i. Ionisation gas flow;
  ii. Nozzle height;
  iii. Treatment speed; and
  iv. Plasma cycle time.

These parameters may influence matrix removal, fibre integrity and surface energisation during treatment in non-trivial ways. In particular, changing the first two listed parameters was found to have a beneficial effect in various embodiments, with departures from industry norms being shown to have a beneficial effect in various circumstances.

The fibres may comprise any one or more of carbon, glass, aramid, basalt and/or metal-based fibres.

The matrix may be a polymeric matrix, for example an organic polymeric matrix such as epoxy.

The method optionally further comprises using a primer arranged to adhere to the activated surface and form a layer thereon. The primer may comprise a curable adhesive.

The method optionally further comprises monitoring the plasma ablation process, and adjusting one or more plasma treatment parameters accordingly. The plasma treatment parameters to be adjusted may comprise one or more of: temperature, voltage, PCT, plasma power, ionised gas flow, nozzle height, and treatment speed.

The monitoring may be performed using at least one of Optical Emission Spectroscopy (OES) and Plasma Acoustics.

In embodiments using OES, a probe of the OES unit may be directed at a work zone where the plasma is acting on the composite material.

In embodiments using OES, an optical probe of the OES unit may be arranged at an angle of 30° to 60°, and preferably of 55° to 60°, with respect to the plane of the material to be ablated/at an angle of 30° to 60°, and preferably of 35° to 30°, to the plasma source/plume.

The skilled person will appreciate that the plasma source/plume may generally be arranged at right angles to the surface of the matrix being treated.

At least a 100 μm depth of the matrix may be removed from the original surface so as to reveal the new surface.

A sufficient depth of the matrix may be removed from the original surface to entirely expose one or more fibres such that the entirely exposed fibres are separated and can be removed from the composite material.

According to a second aspect of the invention, there is provided a surface preparation method for a composite material having an original surface, the material comprising fibres within a matrix, the method comprising removing a surface portion of the matrix by plasma ablation so as to reveal and activate a new surface with at least a portion of a plurality of the fibres exposed thereon, the method comprising using an ionised gas flow below 3000 l/h at a pressure of 1 bar.

The method may comprise removing the surface portion of the matrix by plasma ablation so as to expose at least a portion of a plurality of the fibres.

The skilled person will appreciate that keeping the pressure and/or flow rate of the ionised gas relatively low (e.g. at 3000 l/h at a pressure of 1 bar) may help to avoid the formation of a HAZ.

The skilled person will appreciate that low-pressure plasma treatment systems, such as that disclosed in U.S. Pat. No. 5,900,104 A, require a sealed plasma treatment chamber such that near-vacuum pressures can be achieved—for example, the chamber pressure is set to 0.4 torr (around 0.5 milli-bar, or around 53 Pa) using a vacuum pump in U.S. Pat. No. 5,900,104 A. The skilled person will therefore appreciate that using an ionised gas flow below 3000 l/h at a pressure of 1 bar (around 750 torr, or around 100 MPa) would be unfeasible and inappropriate in a low-pressure plasma treatment system.

The skilled person will appreciate that the method of the first aspect may be performed using an atmospheric pressure plasma treatment system. The skilled person will appreciate that this may advantageously avoid the need for a vacuum-sealed chamber and vacuum pump.

The method of the second aspect of the invention may include any or all of the features as described with respect to the first aspect.

According to a third aspect of the invention, there is provided a system for creating and activating a surface of a composite material having an original surface, the material comprising fibres within a matrix. The system comprises a plasma generator arranged to generate a plasma, wherein the plasma is arranged to remove a surface portion of the matrix by plasma ablation so as to expose at least a portion of a plurality of the fibres within the matrix without creating a residual heat-affected zone, so as to reveal and activate a new surface of the composite material.

According to a fourth aspect of the invention, there is provided a system for creating and activating a surface of a composite material having an original surface, the material comprising fibres within a matrix, the system comprising a plasma generator arranged to generate a plasma, wherein the plasma is arranged to remove a surface portion of the matrix by plasma ablation so as to expose at least a portion of a plurality of the fibres within the matrix, so as to reveal and activate a new surface of the composite material, the system being arranged to provide an ionised gas flow below 3000 l/h at a pressure of 1 bar.

The skilled person will appreciate that keeping the pressure and/or flow rate of the ionised gas relatively low (e.g. 3000 l/h at a pressure of 1 bar) may help to avoid the formation of a HAZ.

The system of the third or fourth aspect may further comprise a monitoring unit arranged to provide feedback on the plasma ablation process so as to allow plasma treatment parameters to be adjusted.

The monitoring unit may comprise at least one of an Optical Emission Spectroscopy unit and a plasma acoustic unit.

In systems comprising an Optical Emission Spectroscopy (OES) Unit, a probe of the OES unit may be directed at a work zone of the composite material. The probe may be arranged at an angle of 30° to 60° with respect to the plasma source.

According to a fifth aspect of the invention, there is provided an object comprising two portions of composite joined at an interface between a surface of each portion, wherein at least one of the surfaces was prepared using the method of the first or second aspect of the invention or the system of the third or fourth aspect of the invention prior to joining.

The skilled person will appreciate that use of the method of the first or second aspect of the invention or the system of the third or fourth aspect of the invention prior to joining may increase bond strength as compared to an otherwise equivalent composite join, so making the object stronger.

More than two portions of composite may be joined together.

Removing a portion of the matrix by plasma ablation comprises using ionisation energy of the plasma to thermodynamically energise a portion of the composite material beyond the sublimation energy point of the matrix such that the portion of the matrix forms a gas. Plasma ablation as described herein may therefore be described as plasma sublimation. Optionally, continued plasma flow may carry off the sublimed matrix material.

The skilled person will appreciate that the ablation process of various embodiments disclosed herein could be used to enhance the bond strength between two joined components, by enhancing the bond joint strength.

The skilled person will appreciate that the process described could be applied in the preparation of composite materials for bonded repair or fabrication, particularly those composed of multiple components. This technique may enhance the potential of light-weight joining of these materials, obviating the traditional route of fastening individual component together using heavy metal bolts and plates. The traditional method has been shown to give rise to fatigue limitations in the design products, while also increasing the overall weight of composite objects, thereby reducing the weight benefits offered by the use of composite materials. The skilled person will appreciate that weight is often a key factor, in particular in the automotive and aeronautical industries. In addition, composite materials may offer more design freedom than metals; different shapes and designs may be possible, for example reducing or eliminating the need for bolts.

The ablation treatment disclosed herein may offer one or more of the following advantages as compared to prior art surface treatment techniques intended to prepare surfaces for bonding.

Embodiments of the invention may offer a controlled, simple and environmentally clean process that can relatively quickly remove the upper layer of a matrix, for example an organic or polymeric matrix, in a composite material, for example a LWC, with no heat-affected zone (HAZ) being formed. The undamaged composite fibre structure beneath may therefore be exposed. This allows the exposed fibres to interact in the subsequent bonding process which can strengthen the bond joint (for either repair or fabrication purposes) through the fibre re-enforcement of the joint and increased bonding area.

Secondly, the plasma 'activates' the remaining, newly-exposed surface, increasing its surface energy. The skilled person will appreciate that this may further improve the bond-ability of the fibre structure and remaining matrix, facilitating chemical bond formation between a bonding agent and the fibre structure, and offering enhanced interfacial adhesion. In contrast, traditional bonding techniques rely on bonding to the matrix material, which is generally weaker than the fibres (this is a limitation with current standard approaches to composite bonding).

The skilled person would understand that features described with respect to one aspect of the invention may be applied, mutatis mutandis, to the other aspect of the invention.

There now follows by way of example only a detailed description of embodiments of the present invention with reference to the accompanying drawings in which:

FIG. 1 is a schematic representation of a system of an embodiment arranged to perform a method of an embodiment;

FIG. 2 schematically illustrates the original and new surfaces of the composite material before, during and after plasma ablation; and FIG. 3 shows a schematic view of the method of an embodiment of the invention;

Figure 1:
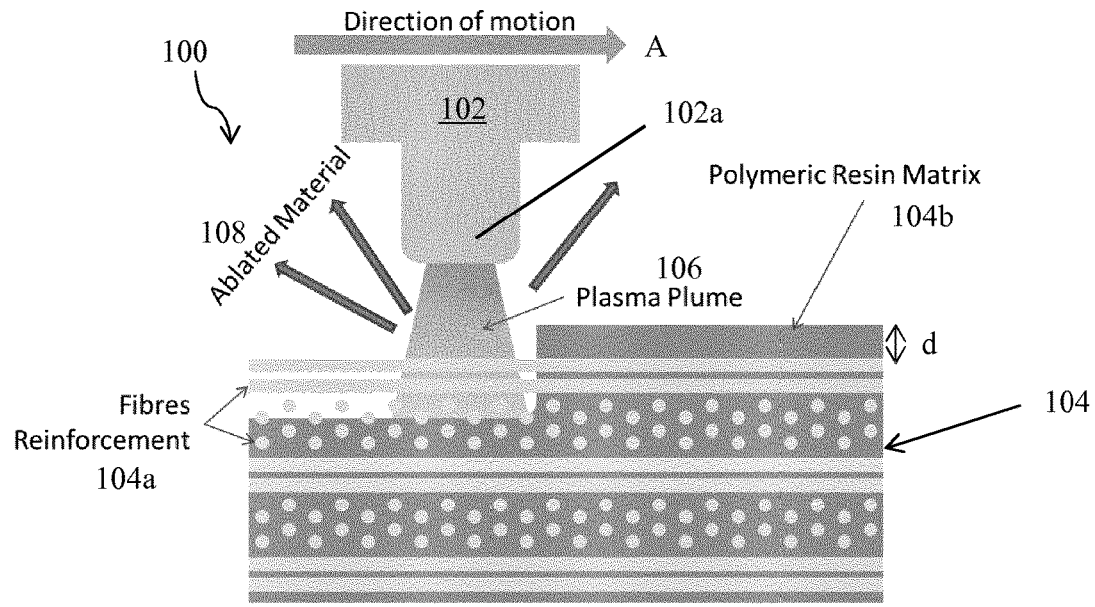

FIG. 1 illustrates plasma ablation of a composite material 104. The plasma 106 is supplied via a nozzle 102*a* of a plasma unit 102. In the embodiment shown, the nozzle 102*a* is moved with respect to the composite material 104 in the direction marked by the arrow A. In alternative or additional embodiments, the composite material 104 may be moved with respect to a stationary or moving nozzle 102*a*. For example, the composite material 104 may be mounted on a moveable sample mount. The rate of movement of the sample with respect to the nozzle 102*a* is referred to as the treatment speed.

The composite material 104 comprises fibres 104*a* within a matrix 104*b*.

In the embodiment being described, the fibres 104*a* are carbon fibres. In alternative or additional embodiments, other fibres may be used, for example glass, aramid and/or basalt fibres. Metal-based fibres may also be used in some embodiments, in addition to or instead of the fibres 104*a* listed above. Advantageously, the fibres 104*a* strengthen the material 104.

In the embodiment being described, the matrix 104*b* comprises a polymeric resin. In alternative or additional embodiments, other matrix materials may be used, for example any suitable organic matrix material or combination of such materials as known in the art. Many polymeric materials may be used for the matrix 104*b*, including one or more of the following list:

Polyester (unsaturated);
Epoxy;
Polyamide;
Polycarbonates;
Polyethylene (PE);
High Density Polyethylene;
Polyphenylene Sulfide (PPS);
Polyetherimide (PEI); and
Polyether ether ketone (PEEK).

In the embodiment being described, the material 104 is a light weight composite material (LWC).

The embodiments of the invention described below involve the use of atmospheric pressure air plasma. In alternative or additional embodiments, other types and pressures of plasmas may be used, for example low pressure (i.e. any pressure below atmospheric pressure) or vacuum plasma may be used, and/or alternative ionisation gases such as oxygen, helium, or nitrogen, or a combination of one or more thereof, may be used instead of air. Alternatively or additionally, one or more organic gases may be used, such as methane.

In the embodiments being described, a blown arc plasma is used. In alternative or additional embodiments, a dielectric barrier discharge plasma may be used. The skilled person would appreciate that in embodiments using a dielectric barrier discharge plasma some parameters may be adjusted as appropriate to allow the same energy to be provided to the plasma plume.

The plasma 106 is used for the controlled ablation of Light-Weight Composite (LWC) polymeric materials. The controlled ablation exposes the fibre structure beneath an original surface layer 110 of the matrix material 104*b* for subsequent bonding applications.

In the embodiment shown in FIG. 1, plasma ablation is performed using a commercially available plasma source (from supplier such as PlasmaTreat, PVA TePla or the likes).

The ablation process, illustrated in FIG. 1, utilises the ionisation energy of the plasma 106 under controlled processing conditions to energise the original upper layer 110 of the composite material 104. Once this is achieved, the solid material 108 ablated by the process effectively 'sublimates' (becomes gaseous). In the embodiment shown in FIG. 1, the ablated material 108 is swept away in the plasma gas flow.

The skilled person will appreciate that ablated matrix material 108 generally comes off as an organic gas (as organic materials such as epoxy or other organic polymers are generally used for the matrix). The gas can interact with, and become part of, the plasma 106. The composition of the plasma 106 is therefore likely to be affected. The skilled person will appreciate that the organic gas is generally naturally exhausted by a pressure gradient of the system 100, and so does not remain within the plasma plume 106 for long.

This ablation (or sublimation) process absorbs energy provided by the plasma system 100 into the matrix 104*b*, advantageously limiting the opportunity for generation of heat-affected zones (HAZ) in the remaining matrix 104*b* and fibre 104*a* material. Advantageously, this absorption of energy reduces energy levels sufficiently that the fibres 104*a* are not damaged. The skilled person will appreciate that a heat-affected zone is an area of a base material which has its microstructure and properties altered by heat—this can deleteriously affect its strength and bonding. Heat-affected zones may also be described and observed as "reflow". In embodiments of the invention, the parameters of the plasma ablation are controlled such that reflow does not occur.

The skilled person will appreciate that, in polymer-based materials (including fibre reinforced composites with a polymeric matrix material), heat-affected zones (HAZ) occur upon exposure to heat which is not sufficient to reach the melting temperature ($T_m$), but has exceeded the glass transition temperature ($T_g$), causing the polymeric material to undergo microstructural changes. The skilled person will appreciate that thermosetting materials, such as epoxies, are generally chemically cross-linked during the curing process, so the cured material does not melt when heated (unlike thermoplastic materials), making $T_m$ inapplicable as the material will instead break down. However, thermosetting materials may still undergo a slight softening (phase change) at elevated temperatures, hence $T_g$ can remain applicable.

Temperatures exceeding the $T_g$ of a material alter the local material properties, often causing weakened areas and/or increased susceptibility to operational failures (fatigue). Typically, in industry, heat causing $T_g$ to be exceeded (so resulting in HAZ formation) may be applied during a welding or heat-intensive cutting operation, but there is also an industry-wide understanding that uncontrolled plasma treatments can result in the appearance of HAZ.

In the embodiments being described, HAZ is avoided during the polymer removal process through the use a relatively low ionisation gas flow rate and treatment height combined with a relatively quick treatment speed (relative to prior art atmospheric plasma treatment regimes), and the use of plasma cycle time (PCT) to modulate the plasma plume's characteristic energy exposure to a surface of the composite material 104. The skilled person will appreciate that this may enable sufficient energy to be supplied to the composite material 104 to cause the polymeric matrix material to be ablated without exceeding $T_g$. In particular, whilst the ablated material may or may not reach or exceed $T_g$, the remaining material does not reach $T_g$. In some embodiments, even the ablated material does not reach $T_g$.

Figure 2:
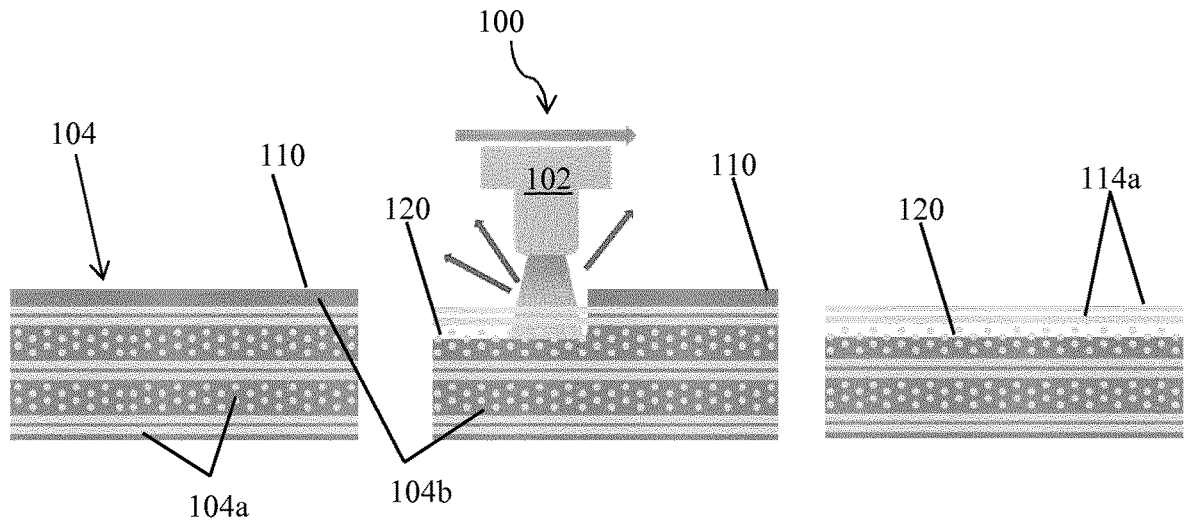

In the embodiment shown in FIGS. 1 and 2, the composite material 104 has an original surface 110.

In the embodiment being described, the nozzle 102*a* of the plasma unit 102 moves from left to right, ablating a layer of the matrix material 104*b* of the composite 104 as it does so. The ablation of the material 104*b* exposes a new surface 120, below the original surface.

The parameters of the plasma ablation are controlled such that the fibres 104*a* are not damaged whilst the matrix material 104*b* is removed. Sufficient matrix material 104*b* is removed to expose a plurality of fibres 104*a*.

The skilled person will appreciate that parameters controlling plasma properties may influence fibre integrity/fibre damage. In the embodiments being described, the parameters are selected and controlled to maintain the integrity of the fibres 104*a* exposed by removal of the polymeric matrix 104*b*. The skilled person will appreciate that, in some embodiments, ionisation gas flow rate and/or nozzle height may be parameters to which fibre damage and/or HAZ formation is particularly sensitive. The skilled person will appreciate that providing sufficient energy to achieve matrix removal, whilst not causing thermal damage to the fibres 104*a* or the matrix 104*b*, may require careful selection and control of these and other plasma parameters. In particular, there may be interactions between plasma cycle time (PCT) and treatment speed—PCT may be decreased or treatment speed increased to reduce or avoid damage to fibre integrity resulting from the highly energised gas (resulting from a relatively low flow rate) and/or the close nozzle (reduced nozzle height).

In studies performed for an epoxy matrix material 104*b* with carbon fibres 104*a* embedded therein, a change in ionisation gas pressure was found to have a larger effect on fibre integrity than any of the other listed parameters (Plasma Power (kHz), Plasma Cycle Time (%), Nozzle Height (mm), and Treatment Speed (mm/s)) in the ranges tested. The other parameters were found to have only a negligible effect on fibre integrity for the epoxy tested.

In these studies, changes nozzle height and gas pressure were found to have the largest effect on polymer ablation, with nozzle height effects being slightly stronger than those of gas pressure. Plasma power changes were found to have only a negligible effect on ablation, and the other parameters to have an intermediate effect.

Nozzle height changes were also found to have the largest effect on plasma activation. Plasma power, PCT, and gas pressure changes were found to have only a negligible effect on activation.

The skilled person would appreciate that which factors dominate and the best combination of parameters may vary for different matrix materials, depending on thermal and other properties of the materials. For example, Epoxy (thermoset) and PEEK (thermoplastic) may exhibit very different properties and consequently be best suited to different combinations of parameters, whereas PEEK (thermoplastic) and PPS (Polyphenylene sulphide—thermoplastic) may be much more similar in their properties and hence in their suitable parameter combinations.

In various embodiments of the invention, a balance of these parameters is selected to allow fibres 104*a* to remain intact and functional after treatment, without the presence of HAZ. In the embodiments being described, additionally achieving maximum activation of the newly-exposed surface is a secondary consideration (as a further plasma activation step could be used if the activation were insufficient), but various embodiments provide a good level of activation in addition to high fibre integrity and HAZ avoidance.

In the example shown in FIGS. 1 and 2, sufficient matrix 104*b* is removed for some fibres 114*a* to become separated from the material 104. These fibres 114b may be removed by the plasma flow, or otherwise removed before bonding of the surface.

The example shown in FIGS. 1 and 2 comprises perpendicular alternating layers of unidirectional fibres 104a. The plasma flow is generally arranged to remove only loose fibres. Preferably partially entrained fibres (those still attached to the residual resin/polymer 104b at any point) are retained as these may act as further anchors between the adhesive in any subsequent bonding process.

In embodiments using woven fabric composites, the uppermost fibres 104a would typically be interwoven with the other fibres beneath (in a weft/warp or twill format). In such embodiments, while the top of the fibre weave might be exposed, a lowest point of each fibre 104a would generally still be attached to the matrix 104b. In such embodiments, generally no fibres would be removed.

The plasma also activates the new surface 120.

In the embodiment shown in FIGS. 1 and 2, no fibres 104a are present within a depth d of the original surface 110. In prior art composite samples, the depth d is often in the range of nanometres (nm) to tens or hundreds of micrometres (μm).

The depth of material removed from the original surface is therefore between a few nanometres and tens or hundreds of micrometres in the embodiments being described, and often on the order of 200-400 μm.

The skilled person will appreciate that the depth, d, is material and process dependent and that the ablated depth can be controlled accordingly. The ablation depth is chosen to remove enough material 104b to expose at least a portion of the fibre structure beneath.

The skilled person will appreciate that depth of removal can vary even for the same polymer and plasma parameters. For example, an epoxy composite produced using an autoclave may have a different ablation energy from an epoxy composite produced using a press-clave, despite being composed of the same constituents. The skilled person would appreciate that, as the consolidation process is more rudimentary in the press-clave, removal would be more rapid, and therefore potential depth of removal is higher for press-clave prepared materials with given plasma parameters.

The skilled person will appreciate that extent of fibre exposure may be a more useful metric than depth of matrix removal in many cases, as the depth of fibre-free matrix may vary between samples, and it is the exposure of the underlying fibres that improves bonding using the technique disclosed herein.

Figure 3:
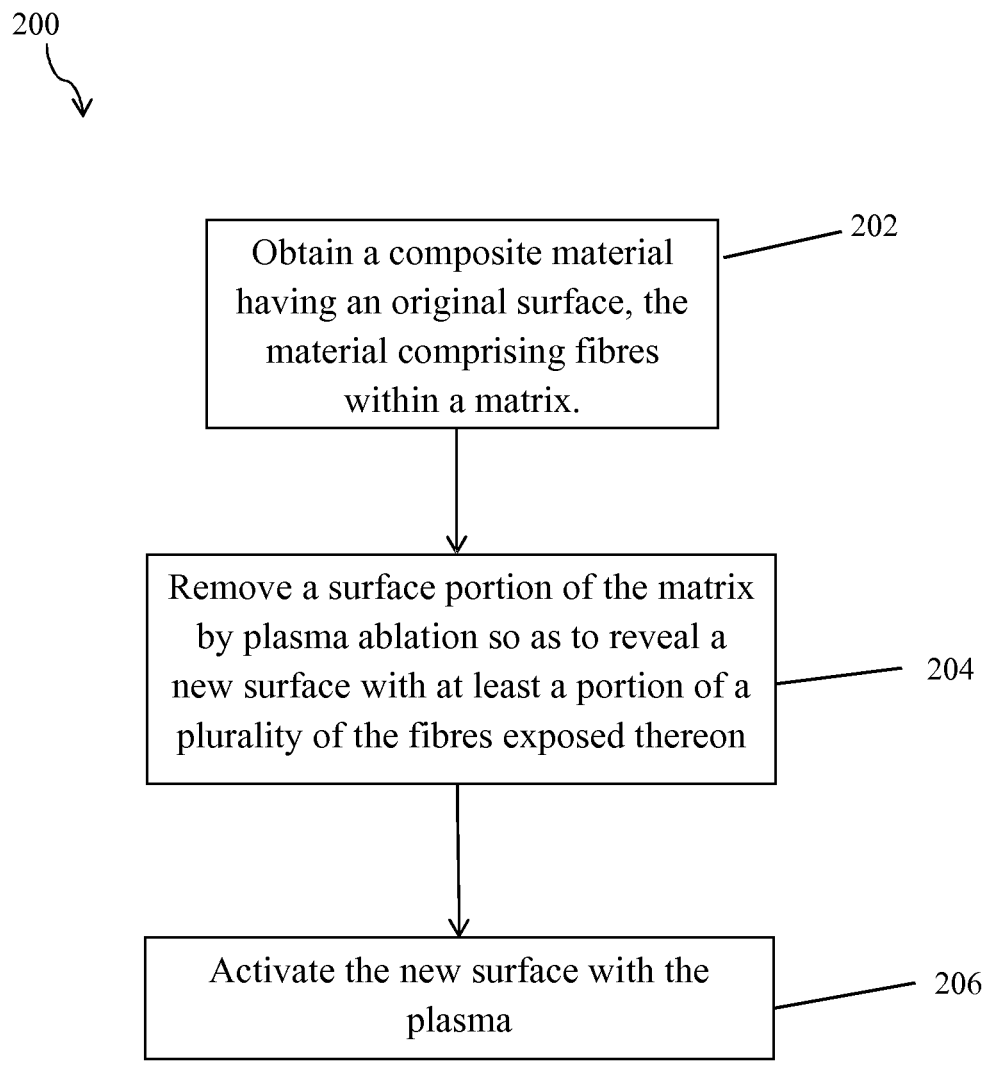

FIG. 3 summarises the method 200 of various embodiments.

At step 202, a composite material 104 is obtained. The composite material 104 comprises fibres 104a within a matrix 104b has an original surface 110. The composite material 104 may be a LWC.

At step 204, a surface portion of the matrix 104b is removed by plasma ablation. The removal of matrix material causes a new surface 120, beneath the original surface 110, to be revealed. Sufficient matrix material 104b is removed such that at least a portion of a plurality of the fibres 104a within the matrix 104b is exposed. Advantageously, this allows the fibres 104a to become embedded within an adhesive or other coating subsequently applied to the new surface 120.

In some embodiments, some fibres 104a may become completely separate from the material 104 and may be removed.

Advantageously, the fibres 104a are not damaged.

At step 206, the new surface 120 is activated.

The skilled person will appreciate that the plasma both removes the portion of the material 104 and activates the resultantly-exposed surface 120. Steps 204 and 206 are therefore generally not strictly sequential, but rather occur in parallel as the plasma 106 interacts with the composite 104. Steps 204 and 206 may be thought of as tailoring of the composite material's surface.

Figure 4:
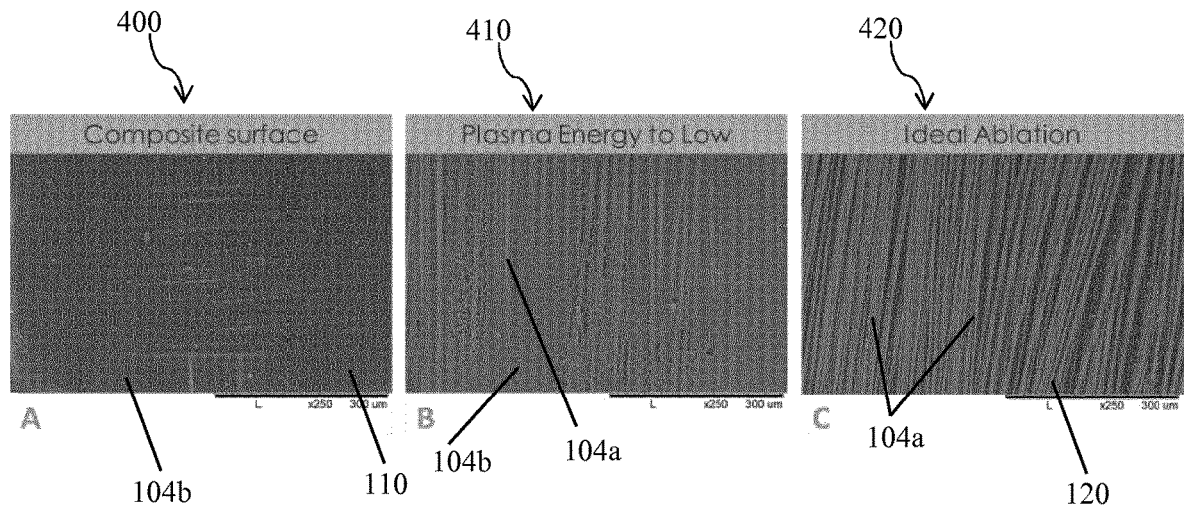
FIG. 4 shows images of composite surfaces demonstrating the effect of plasma energy on the composite surface as the energy is increased into a desired range.
Figure 5:
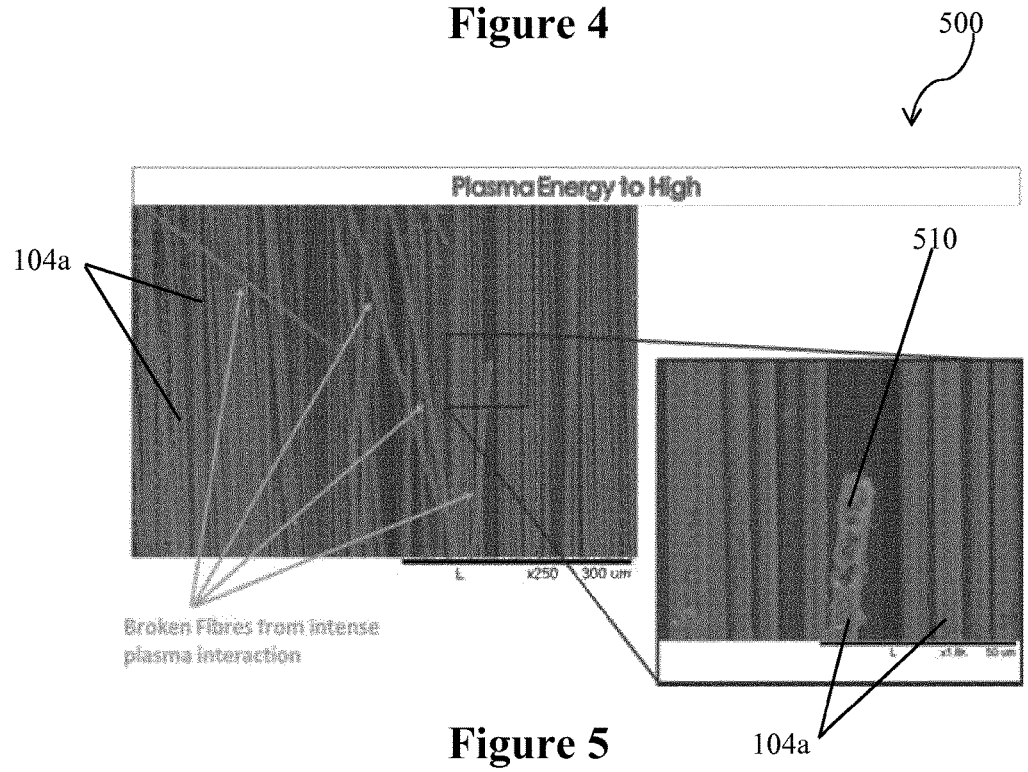
FIG. 5 shows images of composite surfaces demonstrating fibre damage resulting from too high a plasma energy.

FIGS. 4 and 5 show process results of tests performed on epoxy-based composites.

The left-most image 400 in FIG. 4 shows an original surface 110 of a composite material 104. Only the matrix material 104b is visible, as the fibres 104a are beneath the surface.

The middle image 410 shows the surface after treatment with a plasma having a plasma energy set to be relatively low. Some fibres 104a are exposed, but many fibres of the top fibre layer are still hidden beneath the matrix material 104b.

The right-most image 420 shows the surface after treatment with a plasma having a plasma energy set to be higher than that used to create the surface of the middle image. Fibres 104a are exposed all across the surface 120. In the embodiment being described, the complete exposure of the fibre structure was desired so this is termed ideal ablation.

FIG. 5 illustrates fibre damage 500 which can occur if the plasma energy is too high. In embodiments of the invention, plasma ablation parameters are controlled to avoid fibre damage. A broken fibre 104a with a roughened end 510 due to plasma damage can be seen.

Figure 6:
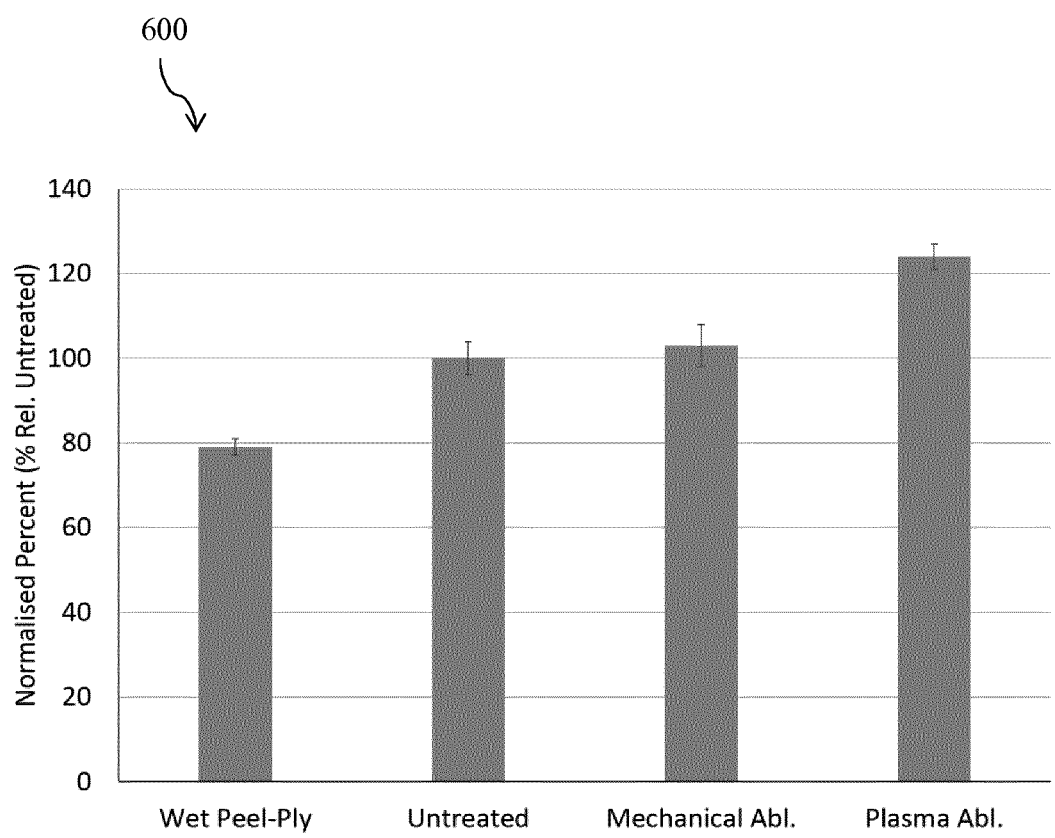
FIG. 6 is a graph comparing tensile bond strength of a join created in line with the invention to that of joins created using prior art techniques.

In addition to the plasma evaluation and process control studies, preliminary mechanical 'pull' (tensile) tests were performed on an assortment of pre-treated and prepared epoxy-based composite samples. FIG. 6 illustrates the results.

In the prior art, wet peel-ply and mechanical roughening (also known as mechanical ablation) are typically used for enhanced bonding applications. These preparation and treatment techniques were included in the tests for benchmarking purposes, in addition to an untreated sample.

The results indicate an increase in the interfacial bond strength for the sample ablated using the plasma technique disclosed herein as compared to the three other samples.

Below, the selection of plasma parameters for embodiments of the invention is discussed.

In initial tests, such as those for which results are shown in FIGS. 5 and 6, the plasma ablation parameters used were determined based on visual and microscopic observation of original and new surfaces. The plasma energy was deemed to be too low when insufficient fibres were exposed (410) and too high when fibre damage was observed (510).

A monitoring system (not shown) is used instead of or as well as visual and microscopic observation in alternative embodiments.

In some such embodiments, the monitoring system may comprise at least one of a plasma acoustic spectroscopy unit and an optical emission spectroscopy unit. The skilled person will appreciate that in situ monitoring may allow plasma energy to be gradually increased to a level at which the matrix 104b is removed, and reduced without interrupting the processing if any sign of fibre damage or reflow develops.

For the surface 120, 420 shown in FIG. 4, the plasma ablation parameters shown in Table I were used. The material 104 under test comprised an epoxy matrix 104b with carbon fibres 104a embedded therein. In this embodiment, a depth of material of between 100-200 μm was removed from the surface. In this embodiment, the fibres 104a of the composite 104 were arranged in a twill (woven) pattern; the removed depth varied across the surface as a result.

TABLE I

Plasma Ablation Parameters (surface 420)

| Substrate Condition | Ionisation Gas Flow (l/h) | Plasma Power (kHz) | Nozzle Height (mm) | Treatment Speed (mm/s) | PCT (%) | Voltage (V) |
|---|---|---|---|---|---|---|
| Full exposure of fibres with no fibre damage and the highest obtainable* activation | 2000 @ ~1 Bar | 24 | 7.5 | 50 | 75 | 309 |

*highest level of activation without fibre damage as assessed across a range of parameters using goniometry to measure activation and microscopy to assess fibre damage.

Some general parameter ranges for this material 104 are shown in Table II. The skilled person will appreciate that similar ranges are likely to be appropriate for various other polymers which have similar characteristics to epoxy. The general plasma ablation parametric ranges were assessed relative to three specific substrate conditions—Polymer Removal, Fibre Integrity and Residual Surface Activation. This assessment was used to refine the parameters, resulting in the selections shown in Table I. The skilled person will appreciate that the parameters are interdependent.

For example, a Plasma Cycle Time (PCT) of at least 70% and a voltage of at least 275V were found to be needed for the treatment speed and other parameters selected; a PCT of 75% and a voltage of 309V were chosen for Epoxy. PCT can be increased for different material types, in particular for more thermally resilient materials such as PEEK, to increase the energy exposure.

In general, ionisation gas flow and plasma power were found to be two key parameters for plasma ablation 200 as discussed herein, followed by nozzle height. The remaining parameters were then adjusted to suit once ionisation gas flow and plasma power had been chosen.

The skilled person will appreciate that, in some embodiments, plasma ablation can be performed using a nozzle located less than 6 mm or more than 8 mm from the composite, for suitable materials and other parameter combinations. For example, as PEEK is a highly energetic material with a high melting temperature, the nozzle height can be reduced as compared to that for epoxy for the same levels of other parameters. For example, for a set of plasma parameters suitable for use with epoxy with a nozzle height of 6 mm, a nozzle height of 2 mm may be appropriate for PEEK. By contrast, for a given material, a more energetic plasma is generally needed for a nozzle height of 10 mm as compared to a nozzle height of 2 mm. In some embodiments, nozzle height is fine-tuned after the other plasma parameters have been selected so as to get the desired plasma properties in the desired work zone (i.e. at the area of the surface of the composite to be treated).

TABLE II

Plasma Ablation Parameter Ranges

| | Plasma Parameters | | | | | |
|---|---|---|---|---|---|---|
| Substrate Condition | Ionisation Gas Flow (l/h) | Plasma Power (kHz) | Nozzle Height* (mm) | Treatment Speed (mm/s) | PCT (%) | Voltage (V) |
| Polymer Removal | 1800-2200 @ ~1 Bar | 23-25 | 6-8 (plasma/ afterglow transition) | 50-60 (can increase) | 70-80 | 275-309 |
| Fibre Integrity | 1800-2200 @ ~1 Bar | 22-25 | 6-8 (plasma/ afterglow transition) | 50-60 (can increase) | 50-80 | 275-309 |
| Residual Surface Activation | 1800-2200 @ ~1 Bar | 23-25 | 6-8 (plasma/ afterglow transition) | 50-60 (can increase) | 50-80 | 212-309 |

*height measured from the original surface, not the newly-exposed surface following ablation.

The skilled person will appreciate that the experiments discussed herein were all performed using gas pressures of around 1 Bar. However, other suitable pressures could be used and the skilled person would appreciate that gas flow (in litres per hour in the table) could be adjusted (e.g. reduced) correspondingly to conserve the number of moles of the or each gas per unit time in the flow.

The skilled person will appreciate that, in some embodiments, plasma ablation can be performed with a treatment speed below 50 mm/s (for example for higher nozzle heights) or above 60 mm/s (for example for lower nozzle heights). For example, at a nozzle height of 2 mm (and/or for a more energetic plasma), a treatment speed of 150 mm/s or even 200 mm/s may provide a sufficient residence time for ablation and activation to occur.

Table III illustrates the general effects of varying the parameters and notes various interdependencies of the parameters, indicating the considerations the skilled person would bear in mind when implementing the present invention.

TABLE III

Parameter Effects and Interdependencies

| Ionised Gas Flow Pressure (l/h) | Plasma Power (kHz) | Nozzle Height (mm) |
|---|---|---|
| Increased Flow Results in a perceived reduction in exposure of the gas to ionisation energy, reducing the number of reactive species per unit volume of the plasma plume and thereby minimising the ablation energy of a given | Increased Power Higher internal plasma energy as the higher frequency produces more higher energy state (excited, dissociated and ionised) reactive species. This can result in thermal damage to the material if not managed with additional parameters, | Increased Height: Exposure of the material 104 to the highly reactive plasma particles is reduced, thereby limiting the transfer of thermodynamic energy into the material 104 (as such, increased height is |

TABLE III-continued

Parameter Effects and Interdependencies

| | | |
|---|---|---|
| volume of plasma. Higher flow can be used to limit reflow issues.<br>Decreased Flow Enables the gas to be exposed to the ionisation process for longer (increased resonance time), and increases the number of plasma reactive species per unit volume, therefore, more energy per volume of plasma. However, low flow/high concentrations of active species can result in charring and reflow damage if not managed correctly. | such as Ionised Gas Flow and PCT.<br>Decreased Power If the power is too low, mis-strike of the plasma may occur, or an unstable plasma may form.<br>Upon a slight increase, activation properties are improved. Increasing power too far increases the likelihood of charring or reflow issues on the matrix (e.g. polymer) surface 110. | generally more useful for activation only than for ablation in addition)<br>Decreased Height: Exposure of the material 104 to the reactive plasma species facilities energy transfer to the material, which allows the ablation threshold energy* to be met more easily. |
| Treatment Speed (mm/s) | Plasma Cycle Time (%) | Voltage (%) |
| Faster:<br>Less dwell time, and as the ablation process takes some time (be that ns, µs seconds, or more), there is less opportunity for the process to 'finish' (i.e. for all of the matrix within a region in which the ablation threshold energy is met to have been ablated such that no further ablation would occur without a parameter change)<br>Slower:<br>Increased dwell time, more likelihood of thermal damage, as the ablation process finishes the energy originally applied to the ablation of material will translate to thermal Therefore, there exists a 'sweet-spot' in treatment speed - this is dependent on both the other treatment parameters and the nature of the material being treated. | Increased Cycle Time:<br>Higher quantity of reactive species in the plasma for an extended temporal and spatial base. Can cause damage to the polymer structure due to increased energy per unit volume. Can be managed by adjusting other parameters (e.g. Ion. Gas Flow and Power)<br>Decreased Cycle Time: Opposite of the above; the plasma plume is active for shorter time periods, therefore the reactive species last for a shorter time.<br>This is traditionally used to diminish the thermal input of a plasma, as the reactive species are regulated | Increased Voltage:<br>Higher stability of the plasma plume, allowing for a more homogeneous plasma. If not managed, however, high voltages can cause damage to the fibre structure 104a due to striking. A low enough voltage to reduce or eliminate the risk of striking is therefore preferable.<br>Decreased:<br>If voltage is too low, mis-strike of plasma may occur, or an unstable plasma may form. Most plasma treatments require the voltage difference across a plate to be sufficiently high to strike. Voltage is dependent on Ion. Gas Flow, Plasma Power and PCT, or vice versa. |

*calculating precise ablation threshold energies is usually unnecessary - in general, it is sufficient to note that increased nozzle heights do not result in ablation (even in the event of comparable plasma parameters), while lower heights do. Therefore, within suitable ranges of the other parameters, there is generally a transitionary phase of nozzle height that means the ablation threshold has been passed. This is due to the lower height having a higher energy of exposure in the form of electrons and ion energy. Too low a height can damage the fibres; the ablation energy of the fibre material may be exceeded, which is not desirable for the embodiments being described.

Further examples of plasma parameters and operational trade-offs are discussed below.

Ionisation gas flow controls the amount of ionisation gas that passes the plasma's electrode with time. Decreasing this flow too low could cause an unstable plasma to form. Too high a flow means that the gas residence time (time spent being energised by the electrode) is low, so electron and ion production may be diminished for a given plasma regime. This would cause a reduction in the active energy within the plume.

PCT controls the amount of time for which the electrode is active while a gas passes by (so as to form a plasma). It therefore determines the amount of time for which the available energies will be imparted to the gas for energisation, and therefore directly affects the transmission of energy to the plasma. High PCT results in a higher temperature, low PCT results in a lower temperature. PCT operates most effectively once a thermodynamically stable plasma has been generated.

If the ionisation gas flow is increased, the PCT can be increased to achieve a similar ion/electron field density over a larger spatial area. However, if a spatial expansion is not achieved, plasma temperature may increase.

If the plasma reaches a point where the electron field temperature is equivalent to ion temperature, the plasma is considered to have reached a state of thermodynamic equilibrium. That means the plasma is 'sustainable' (input vs. output is equal, i.e. electrically neutral). This is generally a prerequisite for stable plasma processes, otherwise, species density and temperature might be spatially dependant (not truly a stable, uniform plasma). The skilled person will appreciate that, if a plasma field (away from the electrode) is stable it means that any unit of space within it would have very similar properties (species density, temperature etc. would be uniform and equal). If it is unstable, then this uniformity is lost, and areas of the plasma could be extremely hot, for example, potentially due to more electrons being present than ions. A stable plasma is generally preferable, as a stable plasma can be controlled and managed more easily, for more repeatable results.

The transfer of energy from the electrons to available atoms/ions of the ionisation gases (typically oxygen, argon and nitrogen atoms/ions in atmospheric plasmas, helium may also be used, although it is expensive) should be at the same rate as the energy is being produced—this is what supports the plasma's electron stability. This stability remains dependant on the operator's controls, i.e. if the energy input is turned off or the parameters altered, the plasma will cease or change.

In use, ionisation gas flow controls the amount of oxygen, argon and nitrogen in the plasma, and the PCT controls the temporal aspect of the radio frequency energy input (how often the atoms are excited). A plasma running at 22-25 kHz has the potential to create a large thermal influx of energy through electrons cleaved from a broad range of atoms, thus creating an equal number of ions. An equal field density (and therefore charge) of ions and of electrons should therefore be present.

Ion Gas Flow: The number density of atoms, and thus the density of produced ion fields, affects the thermodynamic stability of the plasma as ions absorb energy from the electron field.

PCT: Allows time for the energy transfer and energy fields to reach a stabilised state. If the PCT is too high, the thermal equilibrium that is reached may be too hot, which may result in reflow In general, for a given plasma regime, a higher PCT means a higher temperature, and a lower PCT means a lower temperature—however, the skilled person will appreciate that the relationship may not be linear.

The skilled person will appreciate that the selection of a PCT value may depend on multiple factors. The material type (matrix, and possibly also fibre material) and the desired treatment depth (e.g. minimum depth below surface at which fibres can be found) are two such factors likely to affect the choice.

When setting plasma parameters, PCT is often the last parameter to be set; traditionally, for standard treatments, PCT would be regularly checked and changed as appropriate to avoid thermal damage to thermally sensitive materials. In embodiments described herein, the intention is to produce a plasma that satisfies the thermally sensitive nature of the matrix, but exceeds its ablation energy.

As touched on above, PCT has an effect on thermodynamic stability for a given plasma regime, and also on the working energy (and thus temperature) of the plasma plume.

For tasks for which higher energies are desired, a higher PCT is generally used. Ablation is one such task, as the intention is to achieve thermal stability of the plasma by using not only the gases present (oxygen, nitrogen and argon), but also the solid polymer matrix (which is sublimated and turned into a gas). The skilled person will appreciate that an unstable plasma could result in reflow in hotter regions.

The skilled person will appreciate that PCT and nozzle height can be adjusted to allow the depth of ablation to be controlled.

Other parameters such as frequency, ion gas pressure, and voltage affect other attributes of the plasma.

The skilled person would appreciate that, if planning to apply the technique disclosed herein to a new composite material, the following factors might be considered to determine the plasma parameters to use.

$T_m$ (melt temperature) of the new polymeric material. $T_m$ is indicative of an ablation threshold, although other factors can have effects. Suitable power, PCT, and gas flow ranges can be estimated based on this information.

$T_g$ (glass transition temperature) of the new polymeric material. $T_g$ is indicative of a temperature above which reflow/HAZ formation is likely, although other factors can have effects. Suitable power, PCT, and gas flow ranges can be estimated based on this information.

Process under which the polymer matrix is consolidated (autoclave: full consolidation likely—taken as listed in the polymer's data sheet, oven consolidated: assume considerably lower thermodynamic stability—'easier' to remove). Knowledge of the process can be used to narrow the power and PCT ranges.

Fibre structure beneath—e.g. woven or uni-directional (UD). UD structures can generally absorb more energy per unit time than woven structures, potentially due to the alignment of the fibres enabling the conduction of energy away from the site of treatment, gas flow—gas flow may be adjusted to modulate energy density. For example, if the gas flow drops, this may increase the energy density, and so the exposed energy is higher. A higher required energy can be obtained in this way.

voltage and nozzle height are then decided. The skilled person will appreciate that a lower maximum voltage limit may be set for UD structures as un-tethered fibres may encroach on the electrodes and cause arcing. Nozzle height can be specified by the resulting plume appearance prior to treatment. The choice of nozzle height may be related to fibre structure in that, as the Ionisation Gas Flow is changed to increase the density of the plasma for unidirectional (UD) composites, the plasma plume's length will be shortened and so a shorter nozzle height may be needed. By sight (examining appearance of the plume), the intent is to get a similar location of this shortened plume in contact with the surface area. In general, maintaining the plasma between the region after the blown arc, and before the full afterglow is found to be the most effective for plasma ablation.

Desired depth of removal (or amount of fibre exposure)— e.g. full, partial or surface skimmed ablation. The skilled person will appreciate that material properties will affect the parameters suitable for a given depth. Nozzle height, ion gas flow, power, PCT and treatment speed all affect depth of removal.

Figure 7:
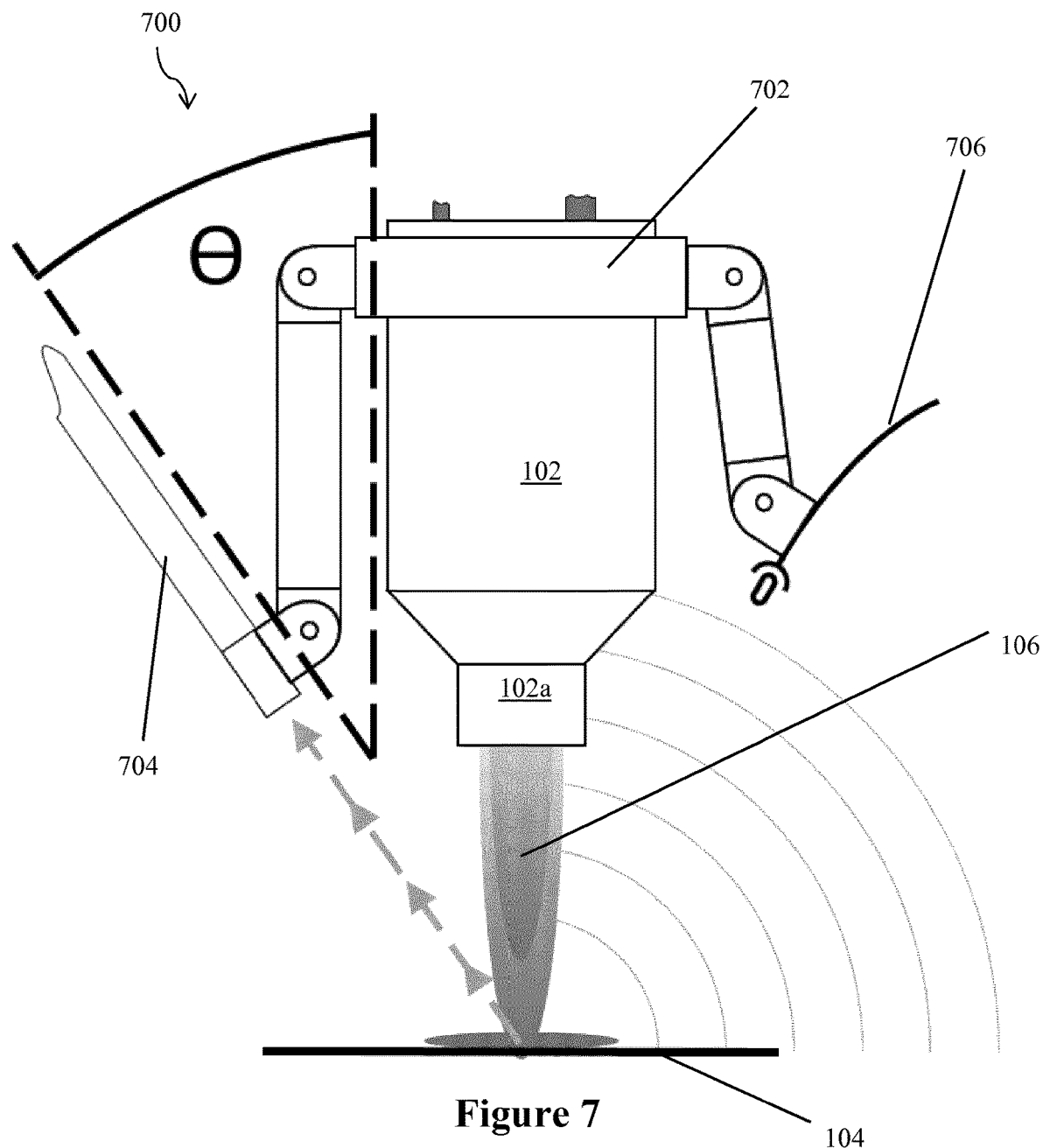
FIG. 7 is a schematic illustration of a monitoring system of an embodiment.

Instead of, or as well as, examining the plume by sight an optical emission spectroscopy (OES) monitoring system 700 (as shown in FIG. 7) may be used in some embodiments.

In the embodiment being described, the monitoring system 700 comprises a chassis 702 mounted on the plasma unit 102. In alternative embodiments, the monitoring system 700 may not be connected to the plasma unit 102.

In the embodiment being described, the monitoring system 700 comprises an optical emission probe 704. In this embodiment, the optical probe 704 is mounted on the chassis 702, in this case by means of a moveable arm which allows a position and angle, θ, of the probe 704 to be adjusted.

In the embodiment being described, θ is the angle between the probe 704 and the plasma plume 106. In the embodiment being described, the angle between the plasma plume 106 and the surface 104 where the material is worked is 90° and therefore the angle between the probe and the 704 and the surface 104 is (90-0°).

In the embodiment being described, the monitoring system 700 comprises an acoustic probe 706. In this embodiment, the acoustic probe 706 is mounted on the chassis 702, in this case by means of a moveable arm which allows a position and angle of the probe 706 to be adjusted.

In additional or alternative embodiments, only one kind of probe 704, 706 may be used, or one or more different probes may be used.

In prior art OES monitoring systems, the optical probe 704 is arranged to look straight through the plasma 106, generally above the work zone 104, so as to gauge the temperature and/or content of the plasma. In such prior art systems it is sufficient to gather information on the plasma at a relatively large distance from the work zone (i.e. the region in which the composite material is being treated with the plasma)—this is because it is sufficient to have information on the original plasma prior to any work/ablation. The probe 704 of such prior art systems is therefore generally arranged at 90° to the plasma source at some distance from the work zone allowing a simple OES monitoring system set up. By contrast, in the system 700 described herein, the probe 704 must view a region close to or within the work zone 104. Therefore a different OES set up is required. The inventor has realised that the probe 704 can be arranged at an angle so as to look at the work zone, or along the plane of the sample to look at the work zone.

In the embodiment being described, the angle, θ, between the source and the probe 704 is between 30° and 60°, and more specifically is around 55°. The skilled person will appreciate that, in the present monitoring system 700, it is not the plasma itself that is being monitored, but rather the effect of the plasma 106 on the composite material 104.

The skilled person will appreciate that, in many embodiments, the angular limitation is influenced by the geometric shape of the applicator (i.e. the plasma nozzle in this embodiment). As such, there may be opportunities to increase or decrease the angle if a thinner applicator/nozzle is used.

In alternative embodiments, the optical probe is aligned with the surface of the sample and directed along the surface towards the work zone. In such embodiments, the angle of around 90° between the plasma plume 106 and the probe 704 is the same as for the prior art, but the position is different with respect to the sample 104. As for the embodiment shown in FIG. 7, the probe 704 would again look at the work zone instead of through a portion of the plume 106 remote from the work zone.

The monitoring system 700 may be used in a feedback loop to adjust plasma parameters in real-time so as to avoid heat-affected zones whilst maintaining ablation and activation of the composite surface.

In some embodiments, a primer is used on the new surface 120. The primer may be selected to increase adhesion of the new surface 120. In the embodiment being described, the selected primer is a silicone/silicate based primer. In alternative or additional embodiments, solvent-dissolved adhesive/polymer primers may be used; the solvent may be water. Optionally the primer is or comprises a mixture of silicone and resins; for example a primer such as DL 435.10 may be used. The skilled person will appreciate that any suitable primer known in the art may be used, for example EC-3960 or EC-5000.

The skilled person will appreciate that, in additional or alternative embodiments, any suitable curable adhesive known in the art may be used as a primer. Preferably, the adhesive is diluted with a solvent; the lower viscosity solution can be sprayed onto the surface 120 more easily.

The skilled person will appreciate that primers can be used to increase bond strength of subsequent joins to other portions of material.

Preferably, the primer is applied immediately after ablation, whilst the new surface remains activated. The skilled person will appreciate that surface activation decays over time and that adding a primer promptly may help to create a stronger bond between the activated surface and the primer.

Some examples of suitable combinations of material parameters and plasma parameters are provided in Table IV, below.

The skilled person will appreciate that the voltage may be reduced if striking between the fibres and the plasma electrode occurs.

TABLE IV

Sample Parameter Combinations

| Material Parameters | | | Plasma Parameters | | | | | |
|---|---|---|---|---|---|---|---|---|
| Fibre material | Matrix Material | Approx. depth of resin to fibres (μm) | Ionisation Gas Flow @ 1 Bar (l/h) | Plasma Power (kHz) | Nozzle Height (mm) | Treatment Speed (mm/s) | PCT (%) | Voltage (V) |
| Carbon/ Basalt | Epoxy | 0-50 | 2000 | 24 | 7 | 100 | 75 | 309 |
| Carbon/ Basalt | PEEK (Polyether ether ketone) | 0-50 | 1800 | 25 | 6 | 100 | 80 | 309 |
| Carbon/ Basalt | PPS (Polyphenylene Sulfide) | 0-50 | 1800 | 24 | 6 | 100 | 80 | 309 |
| Glass | PEI (Polyether Imide) | 0-50 | 2000 | 24 | 7 | 100 | 80 | 309 |
| Glass | PE (Polyethylene) | 0-50 | 2200 | 23 | 7 | 100 | 75 | 309 |

TABLE IV-continued

Sample Parameter Combinations

| Material Parameters | | Approx. depth of resin to fibres (μm) | Plasma Parameters | | | | | |
|---|---|---|---|---|---|---|---|---|
| Fibre material | Matrix Material | | Ionisation Gas Flow @ 1 Bar (l/h) | Plasma Power (kHz) | Nozzle Height (mm) | Treatment Speed (mm/s) | PCT (%) | Voltage (V) |
| Glass | Epoxy | 0-50 | 2000 | 24 | 7 | 100 | 75 | 309 |
| Glass | PEEK | 0-50 | 1800 | 25 | 6 | 100 | 80 | 309 |
| Glass | PP (Polypropylene) | 0-50 | 2200 | 23 | 8 | 100 | 75 | 309 |

The invention claimed is:

1. A surface preparation method for a composite material having an original surface, the material comprising fibres within a matrix, the method comprising:
removing a surface portion of the matrix by plasma ablation so as to reveal and activate a new surface with at least a portion of a plurality of the fibres exposed thereon, without creating a residual heat-affected zone; wherein the plasma ablation is performed using:
(i) an ionised gas flow of 1800-2200 l/h;
(ii) a plasma nozzle close enough to the material to allow material to be ablated; and
(iii) a rate of movement between the material and the nozzle slow enough for the surface preparation to be completed and fast enough to avoid thermal damage.

2. The method of claim 1, further comprising controlling the plasma ablation so as to do at least one of the following:
(i) keep a temperature of the non-ablated material below a threshold temperature above which reflow occurs;
(iii) manage ion gas flow and Plasma Cycle Time so as to allow a plasma power of 22-25 kHz to be used without thermal damage to the material;
(iv) keep nozzle height below 9 mm; and
(v) avoid damaging the fibres.

3. The method of claim 1, wherein plasma ablation is performed using any one or more of:
(i) a Plasma Cycle Time of between 50% and 85%;
(ii) a plasma power of 22-25 kHz;
(iii) a plasma nozzle located between 6 mm and 8 mm from the material;
(iv) a voltage of 212-309 V; and
(v) a treatment speed of 50-60 mm/s.

4. The method of claim 1, wherein the fibres comprise any one or more of carbon, glass, aramid, basalt and/or metal-based fibres.

5. The method of claim 1, wherein the matrix is a polymeric matrix.

6. The method of claim 1, further comprising using a primer arranged to adhere to the activated surface and form a layer thereon, the primer optionally comprising a curable adhesive; and/or further comprising monitoring the plasma ablation process, and adjusting one or more plasma treatment parameters accordingly, wherein the plasma treatment parameters may comprise one or more of: temperature, voltage, PCT, Plasma power, ionised gas flow, and treatment speed, the monitoring optionally being performed using at least one of Optical Emission Spectroscopy and Plasma Acoustics.

7. The method of claim 1, wherein at least a 100 μm depth of the matrix is removed from the original surface so as to reveal the new surface; or wherein a sufficient depth of the matrix is removed from the original surface to entirely expose one or more fibres such that the entirely exposed fibres are separated and removed from the composite material.

8. A system for creating and activating a surface of a composite material having an original surface, the material comprising fibres within a matrix, the system comprising a plasma generator arranged to generate a plasma, wherein the plasma is arranged to remove a surface portion of the matrix by plasma ablation so as to expose at least a portion of a plurality of the fibres within the matrix, so as to reveal and activate a new surface of the composite material, wherein the system is configured to perform plasma ablation using:
(i) an ionised gas flow of 1800-2200 l/h;
(ii) a plasma nozzle close enough to the material to allow material to be ablated; and
(iii) a rate of movement between the material and the nozzle slow enough for the surface preparation to be completed and fast enough to avoid thermal damage.

9. The system of claim 8, wherein the system further comprises a monitoring unit arranged to provide feedback on the plasma ablation process so as to allow plasma treatment parameters to be adjusted, and wherein optionally the monitoring unit comprises at least one of an Optical Emission Spectroscopy (OES) unit and a plasma acoustic unit.

10. The system of claim 9 comprising:
(a) an OES unit and wherein a probe of the OES unit is directed at a work zone of the composite material; or
(b) an OES unit and wherein a probe of the OES unit is arranged at least one of:
(i) at an angle of 30° to 60° with respect to the plasma source; and
(ii) at least substantially parallel to and level with the original surface of the material.

* * * * *